(12) United States Patent
Kolmanovsky et al.

(10) Patent No.: US 6,393,832 B1
(45) Date of Patent: May 28, 2002

(54) FUEL INJECTION METHOD FOR AN INTERNAL COMBUSTION ENGINE

(75) Inventors: Iiya Vladimir Kolmanovsky, Ypsilanti; Jessy W. Grizzle, Ann Arbor; Jing Sun, Bloomfield, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/525,803

(22) Filed: Mar. 15, 2000

(51) Int. Cl.[7] ................................................. F04N 3/00
(52) U.S. Cl. ............................ 60/286; 60/274; 60/284; 60/285; 60/300; 60/301
(58) Field of Search ........................... 60/274, 284, 285, 60/286, 295, 300, 301; 123/520

(56) References Cited

U.S. PATENT DOCUMENTS

| | | | | |
|---|---|---|---|---|
| 4,955,339 A | * | 9/1990 | Sasaki et al. ................ 123/295 |
| 5,207,058 A | * | 5/1993 | Sasaki et al. .................. 60/286 |
| 5,642,705 A | * | 7/1997 | Morikawa et al. ............. 60/285 |
| 5,910,096 A | * | 6/1999 | Hepburn et al. ............... 60/286 |
| 6,109,024 A | * | 8/2000 | Kinugasa et al. .............. 60/286 |
| 6,141,960 A | * | 11/2000 | Takami et al. ................. 60/286 |
| 6,145,306 A | * | 11/2000 | Takagi et al. .................. 60/285 |
| 6,173,570 B1 | * | 1/2001 | Mitsumoto et al. ............ 60/285 |
| 6,237,328 B1 | * | 5/2001 | Kerns .............................. 60/285 |
| 6,240,724 B1 | * | 6/2001 | Kudou et al. ................... 60/285 |
| 6,256,982 B1 | * | 7/2001 | Kerns .............................. 60/285 |

* cited by examiner

Primary Examiner—Thomas Denion
Assistant Examiner—Diem Tran
(74) Attorney, Agent, or Firm—Allan J. Lippa

(57) ABSTRACT

A fuel injection method and strategy for an internal combustion engine wherein the fuel injection event that occurs during each combustion cycle of a four-cycle internal combustion engine. A first fuel injection event may occur during the intake stroke of the combustion cycle, thereby creating a lean homogeneous air/fuel mixture. A second fuel injection event may occur during the compression stroke. The combustion gases created in the combustion chamber of the engine are transferred to an exhaust system during the exhaust stroke. The injected fuel mixes with the air present in the combustion chamber to create a lean air/fuel mixture. The valve timing for the engine is deliberately adjusted to a setting that is less than the maximum torque setting where hydrocarbon production occurs during the combustion event. The exhaust gas hydrocarbon content for any given ignition spark timing increases as the injection timing before top dead center is increased.

6 Claims, 5 Drawing Sheets

FUEL INJECTION METHOD FOR AN INTERNAL COMBUSTION ENGINE

TECHNICAL FIELD

The invention relates to four-stroke cycle internal combustion engines, particularly to an exhaust gas temperature management method to optimize exhaust emission quality.

BACKGROUND ART

Contemporary internal combustion engines for use in automotive vehicle drivelines may use a three-way catalytic converter in the exhaust gas flow circuit for the purpose of reducing carbon monoxide, unburned hydrocarbons and oxides of nitrogen. To improve $NO_x$ removal, it is known design practice to use an additional three-way catalytic converter, often referred to as a lean $NO_x$ trap (LNT), at the exhaust flow outlet side of the upstream three-way catalytic converter. At periodic intervals, the lean $NO_x$ trap and upstream three-way catalyst can be purged by momentarily enriching the fuel mixture to produce excess carbon monoxide and hydrocarbons, which react with the trapped $NO_x$ to produce nitrogen and carbon dioxide. The time interval for operating in the rich mode is very short compared to the LNT total operating time.

The temperature of exhaust gases passing through the catalytic converter and the lean $NO_x$ trap must be controlled so that the reactions taking place in the presence of catalysts will have optimum efficiency. Optimum $NO_x$ emission control is obtained when LNT temperature is in a predetermined temperature range; for example, 250° C. to 450° C. Under low load operating conditions, however, the three-way catalyst and the lean $NO_x$ trap temperatures may be too low for efficient operation.

A known method for generating additional heat of exhaust gases includes generating additional unburned hydrocarbons, which will react with oxygen in the three-way catalytic converter and release additional heat. The additional unburned hydrocarbons are generated in some known systems by directly injecting fuel into the combustion chamber during the exhaust stroke of the combustion cycle. This fuel does not create added torque, but it does partially disassociate in the exhaust stroke when it encounters hot exhaust gas. This added fuel is not burned in the combustion chamber, but it provides excess hydrocarbon content to the exhaust gases, which must be oxidized by excess air to generate additional heat.

Stratified charge engines, which are known in the automobile industry, include fuel injectors that inject fuel directly into the combustion chamber of the engine during the compression stroke when operating in the stratified mode. The injected fuel mixes with the air inducted from an air intake manifold through one or a pair of intake valves to create a mixture that is relatively rich near the ignition point and within the ignition kernel, but the air/fuel ratio becomes progressively more lean as the stratified charge distribution travels through the combustion chamber to regions where the mixture becomes too lean to support combustion. The average air/fuel ratio for the entire stratified charge, however, may be outside the ignitable range of 20:1 to 40:1, although the air/fuel ratio at the kernel is in the ignitable range of about 12:1 to 16:1.

The lean portion of the stratified charge that does not burn is expelled through the exhaust valve during the exhaust stroke of the combustion cycle. This unburned mix is combined with the mix created by the direct injection of fuel into the combustion chamber during the exhaust stroke so that sufficient oxidation or burning of the hydrocarbons may take place in the catalytic converter and, therefore, increase the temperature in the lean $NO_x$ trap.

DISCLOSURES OF INVENTION

The invention comprises a method for controlling hydrocarbon content of exhaust gases of a four-stroke cycle internal combustion engine with spark ignition, the engine having at least one piston and cylinder assembly with an air/fuel combustion chamber. A fuel injector delivers timed fuel injections to the combustion chamber. An ignitor ignites an air/fuel charge in the combustion chamber.

The method includes the steps of injecting fuel during the piston intake stroke as air is drawn into the combustion chamber to form a non-combustible homogeneous mixture, compressing the mixture, injecting fuel also during the piston compression stroke, igniting the stratified charge that is created near the end of the compression stroke and discharging the combustion gases and the non-combustible gases during the piston exhaust stroke, thereby creating excess hydrocarbons in an exhaust gas manifold system.

An embodiment of the invention comprises a method for creating in the combustion chamber a homogeneous air/fuel mixture in addition to a stratified charge resulting from a later injection. The homogeneous mixture is too lean to burn in a homogeneous mode. This lean mixture, which is deliberately produced in a non-combustible air/fuel ratio range, is created by injecting fuel into the combustion chamber during the intake stroke rather than in the compression stroke, as in the case of a conventional stratified charge engine. The charge formed during the intake stroke may have a lean air/fuel ratio such as 30:1 to 40:1. This occurs in advance of the subsequent injection of fuel for stratified charge operation.

The fuel is injected during the intake stroke sufficiently in advance of the closing of the intake valve so that there is enough time for the air and fuel to achieve a homogeneous mix. In a subsequent fuel injection event, a stratified charge is created in the combustion chamber during the compression stroke. Because the air/fuel ratio of the homogeneous mix is too high to support combustion, the homogeneous mix will produce unburned hydrocarbons in the combustion chamber, which are exhausted through the exhaust valve during the exhaust stroke.

The injection of fuel during the intake stroke does not result in an extension of the lean limit for the stratified air/fuel charge. Rather, the injection of fuel during the intake stroke is intended to deliberately obtain a non-extension of the lean limit.

Excess hydrocarbons may be produced in an alternative fashion by controlling the timing of the fuel injection and the spark ignition when the engine is operating in the stratified mode. Unlike conventional stratified charge operations, for which the timings of the injection and the ignition are adjusted to create maximum torque and minimum exhaust gas emissions, the timing characteristic of the present invention is deliberately adjusted so that the fuel is injected earlier than normal. This achieves a lower maximum torque but higher hydrocarbon production. This increase in the hydrocarbon component of exhaust gases provides the necessary excess hydrocarbons to effect optimum temperature for efficient operation of the lean $NO_x$ trap.

The difference in the timing between the injection and the ignition can be achieved by appropriate spark timing adjustment or by fuel injection timing adjustment, or by a combination of both techniques.

Because it is possible for the engine to run with an overall leaner air/fuel mix by applying the teachings of the invention, it is not necessary to rely upon the throttle to the extent required by conventional stratified charge engines. The engine, therefore, may be operated with a more open throttle than the throttle setting normally associated with a conventional engine for the same engine load. This reduces the pumping losses during the intake stroke of the four-stroke cycle.

A further benefit that results from the use of a homogeneous mix created by the injected fuel during the intake stroke is the improvement in thermal efficiency. The invention makes it possible to retain the usual benefits of stratified operation. This is due to the insulating effect of the lean homogeneous mix. The homogeneous mix creates a thermal barrier between the combustible part of the stratified charge and the walls of the combustion chamber during the expansion stroke.

BEST MODE FOR CARRYING OUT THE INVENTION

Figure 1A:
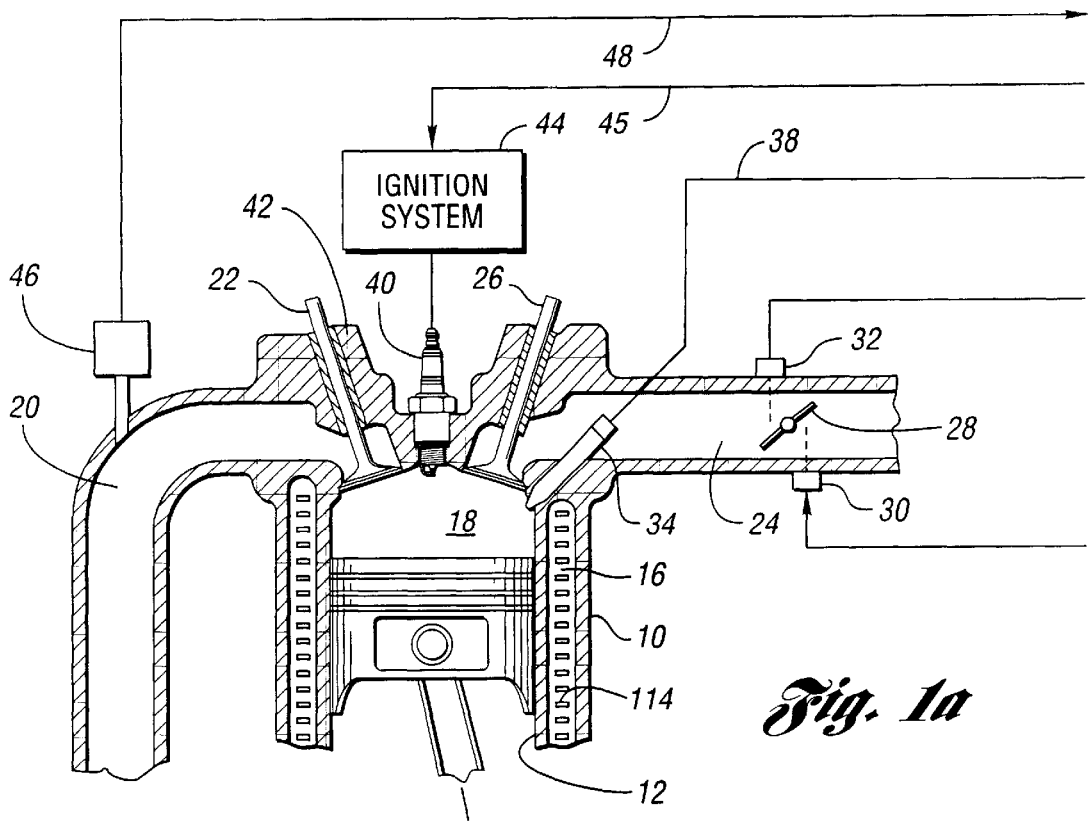
FIG. 1a is a schematic representation of a cylinder and piston assembly for a four-stroke cycle internal combustion engine.
Figure 1B:
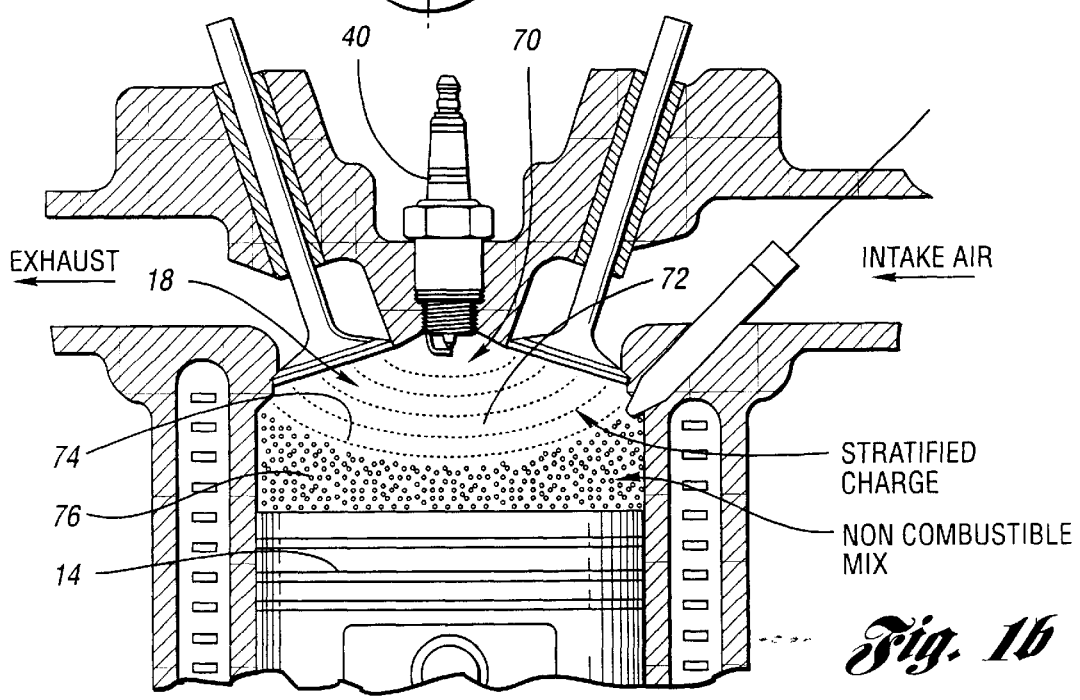
FIG. 1b is a schematic representation of the combustion chamber for an engine of the type shown in FIG. 1a, which illustrates air/fuel charge patterns.
Figure 2:
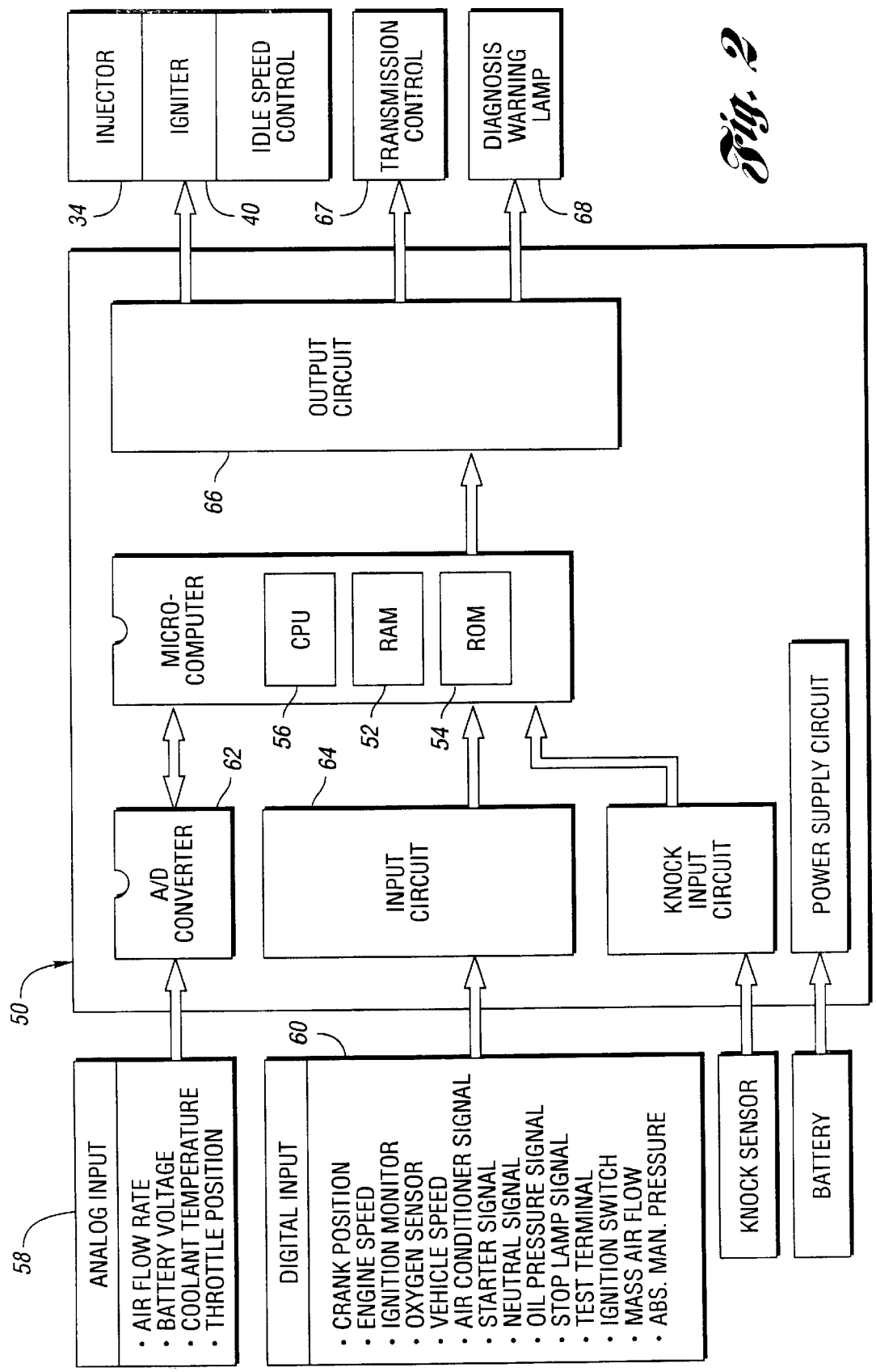
FIG. 2 is a schematic block diagram of a microprocessor for an automotive vehicle engine control and transmission control.

FIGS. 1 and 2 are schematic representations of a four-stroke cycle, direct-injection, internal combustion engine. It comprises a cylinder housing 10, a cylinder 12 and a piston 14 situated in cylinder 12. A coolant jacket 16 is formed in the cylinder housing 10. Coolant in jacket 16 surrounds the combustion chamber 18, which is defined by the upper end of the cylinder 12 and the piston 14.

The engine includes an exhaust passage 20, which communicates with the combustion chamber 18 through an exhaust valve 22. An air intake manifold, which includes passage 24, communicates with the combustion chamber 18 through intake valve 26. The valves 22 and 26 are opened and closed, as will be explained with reference to FIG. 3, during the four-stroke cycle.

An adjustable throttle 28 in the intake air flow passage 24 controls the intake air flow. A stepper motor 30 may be used to adjust the angular setting of the throttle 28. The setting of the throttle is sensed by a throttle position sensor 32.

A fuel injector 34 has a fuel jet within the combustion chamber 18. The fuel injector 34 is driven by an electronic driver, which responds to a signal in signal flow path 38 for a controller that will be described with reference to FIG. 2.

A spark plug 40 is secured in the cylinder head portion 42 of the cylinder housing 10. An ignition system 44 delivers ignition current to the spark plug 40 in response to an ignition signal in signal flow path 45, which communicates with the controller, to be described with reference to FIG. 2.

Oxygen in the exhaust gases is sensed by an exhaust gas sensor 46, which delivers a signal to the controller of FIG. 2 through signal flow path 48.

The controller of FIG. 2 comprises a microcomputer 50, which includes random-access memory (RAM) registers 52 and read-only memory (ROM) registers 54, which contain data that is fetched and acted upon by a central processor unit 56. The computer is a microcomputer of the type well known in the automotive industry for controlling engines and transmissions in an automotive vehicle driveline.

The computer 50 has analog inputs at analog input section 58 and digital inputs at digital input section 60. The analog inputs are received from sensors that measure air flow rate, battery voltage, coolant temperature and throttle position. Throttle position is determined by throttle position sensor 32.

The digital input portion 60 receives data indicating crank position from a crankshaft position sensor 51. It further receives an engine speed signal, an ignition monitor signal, an oxygen sensor signal, a vehicle speed signal, a mass air flow signal, an absolute manifold pressure signal, an air conditioning on/off signal, a starter signal, a neutral signal, an oil pressure signal, a stop lamp signal, a test terminal signal and an ignition switch signal.

The analog information is transferred through an internal bus to an analog-to-digital converter 62 from the analog input portion 58. A digital input circuit 64 receives the digital input signals from input portion 60. A driver output circuit communicates with the eight-bit microcomputer through an internal bus, as indicated at 66. The output of the circuit 66 controls the injector 34 and the ignitor 40. Other outputs, not relevant to the present invention, are transmitted to the electronic control unit for the transmission, as seen at 67, and to a diagnostic circuit 68.

FIG. 1b is a schematic diagram showing the cylinder head and piston following the injection of fuel. A stratified charge is formed by injecting fuel by injector 34 at a region of the combustion chamber during the compression stroke in the vicinity of the ignitor 40. Air enters the combustion chamber past the intake valve 26. The injected fuel in the presence of air creates an air/fuel mixture at zone 70, which is a rich zone with a ratio of about 13:1. The air and fuel disburses away from the rich zone or kernel 70. The burning of the mix is initiated at the kernel 70 and the flame front progresses throughout the combustion chamber. The air/fuel ratio in the stratified air/fuel mixture zone 72 becomes is progressively more lean as the distance from the zone 70 increases. Furthermore, the temperature of the mix in the stratified zone 72 decreases as the distance from the rich zone 70 increases. At the limit of the stratified mix indicated at 74, the air/fuel ratio is too lean to support combustion.

A non-combustible charge 76 is formed in the combustion chamber by injecting fuel during the intake stroke of the piston, as will be explained with reference to FIG. 3. The combustible stratified charge is created by injecting fuel into the combustion chamber during the compression stroke. The introduction of the non-combustible mixture 76 into the combustion chamber thus occurs much earlier than the introduction of the stratified charge. This provides sufficient time for the non-combustible air/fuel mixture to become homogeneous. The air/fuel ratio of the mixture 76 is very high (for example, 30:1), which is too lean to support combustion. When the exhaust valve is open and the exhaust stroke of the piston occurs, the unburned gases in the stratified charge, as well as the unburned lean mixture created by the prior fuel injection during the intake stroke, is discharged through the exhaust valve into the exhaust manifold.

Figure 6:
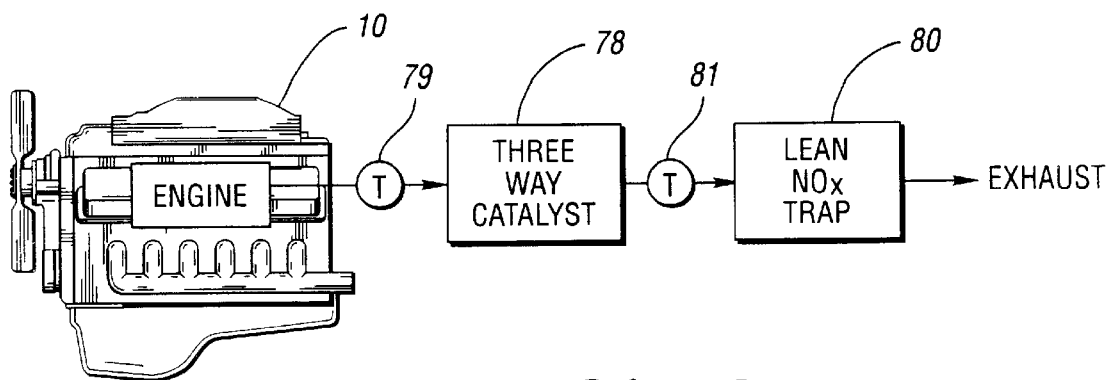
FIG. 6 is a block diagram showing the exhaust flow path from an internal combustion engine through a three-way catalytic converter and a lean $NO_x$ trap.

The exhaust manifold communicates with a three-way catalytic converter containing a catalyst, as seen in FIGS. 6 at 78. A lean $NO_x$ trap 80 is located at the outlet side of the catalytic converter 78, as indicated in FIG. 6.

A temperature sensor 79 is located between the engine and the three-way catalyst to detect the temperature of the exhaust gases in the catalytic converter.

A temperature sensor 81 is located between the catalytic converter and the lean $NO_x$ trap. If the temperature sensed by sensor 81 is within the efficiency window seen in FIG. 8, the routine of the present invention for obtaining excess hydrocarbons is not implemented.

Figure 3:
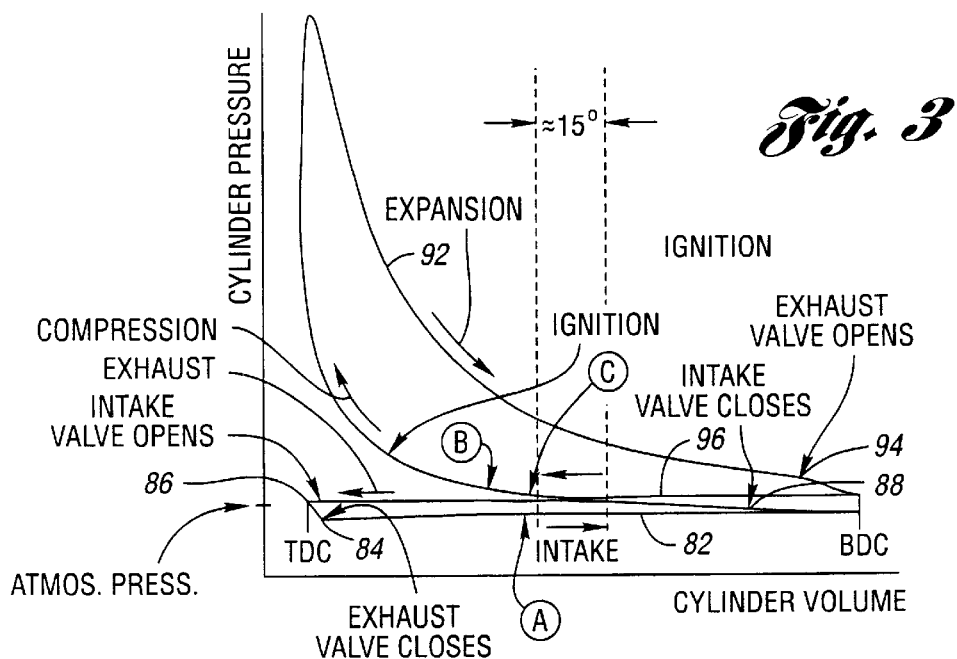
FIG. 3 is a plot of the combustion chamber pressure and combustion chamber volume during the combustion cycle.

FIG. 3 shows a pressure versus volume plot for the combustion chamber. As the piston retracts during the intake stroke from its top dead center position to its bottom dead center position, air is drawn into the combustion chamber as shown at 82. The exhaust valve closes at 84, and the intake valve opens at 86. The pressure drop across the intake valve creates a negative pressure in the cylinder during the stroking of the piston toward the bottom dead center position.

The fuel is injected during the intake stroke at point A, indicated in FIG. 3, for creating a homogeneous mixture.

The intake valve closes at 88, and the compression stroke begins. As shown at "B", fuel is injected during the compression stroke, thus introducing the stratified charge, as indicated at 70 and 72 in FIG. 1b. Ignition occurs, as shown in FIG. 3, during the compression stroke.

When the piston reaches top dead center, burning of the fuel in the stratified charge will have begun. The cycle then enters the expansion stroke 92. At point 94, the exhaust valve opens. The piston then continues traveling to its bottom dead center position, and the exhaust stroke begins, as shown at 96.

Figure 4:
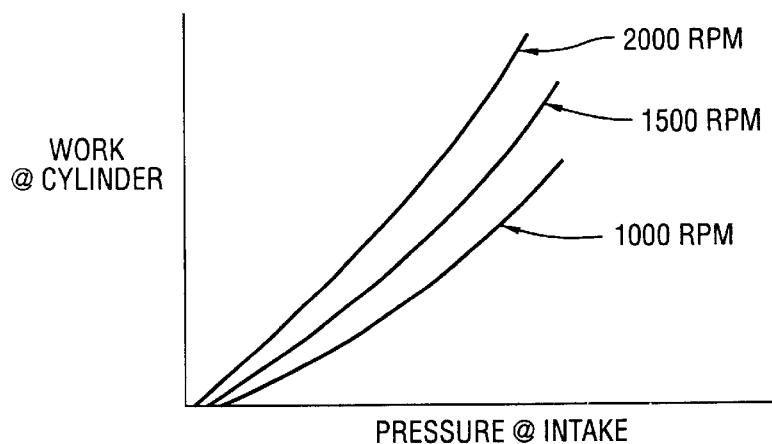
FIG. 4 is a plot of the relationship between the pumping work created at various speeds by the combustible gases in the combustion chamber and the pressure at the intake manifold.

FIG. 4 shows the effect of the throttling of the intake air at the various speeds. The negative pressure developed in the combustion chamber during the intake stroke produces negative work because of the negative pressure. The positive work due to combustion is identified in FIG. 3 as the area between the compression and expansion curves. The net useful work of the combustion cycle then is the algebraic sum of the negative work and the positive work. Thus, if the engine is operating with a relatively open throttle, negative work will decrease, thus producing more positive net work.

The present invention makes it possible for the air/fuel ratio of the stratified charge to be more lean, and thus it is possible to operate the engine at a more open throttle setting. This reduces the negative work and improves the overall operating efficiency of the engine while maintaining sufficient excess hydrocarbons for efficient operation of the catalytic converter and the lean $NO_x$ trap.

Figure 5:
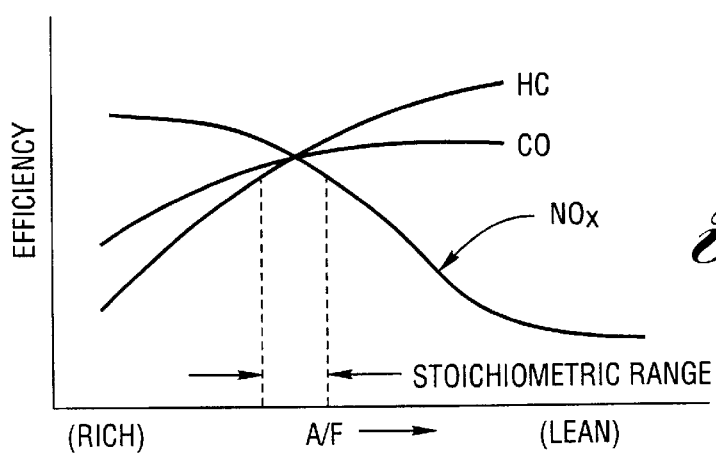
FIG. 5 is a plot of the relationship between air/fuel ratio and the three-way catalytic converter exhaust gas conversion efficiency.
Figure 9:
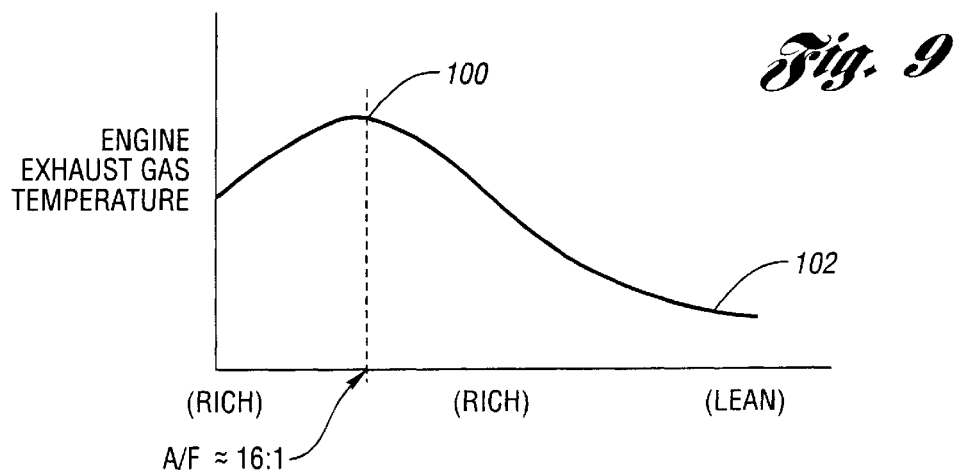
FIG. 9 is a plot of the exhaust gas temperature at the lean $NO_x$ trap with respect to the air/fuel ratio.

FIG. 5 shows a plot of the efficiency of conversion of hydrocarbons, carbon monoxide and $NO_x$ during operation of the engine at various air/fuel ratios. As indicated in FIG. 9, the operating temperature during operation with lean air/fuel ratios is much lower than the temperature of the exhaust gases when the air/fuel ratio is stoichiometric or richer than stoichiometric. This presents a problem with the operating efficiency of the lean $NO_x$ trap.

Figure 8:
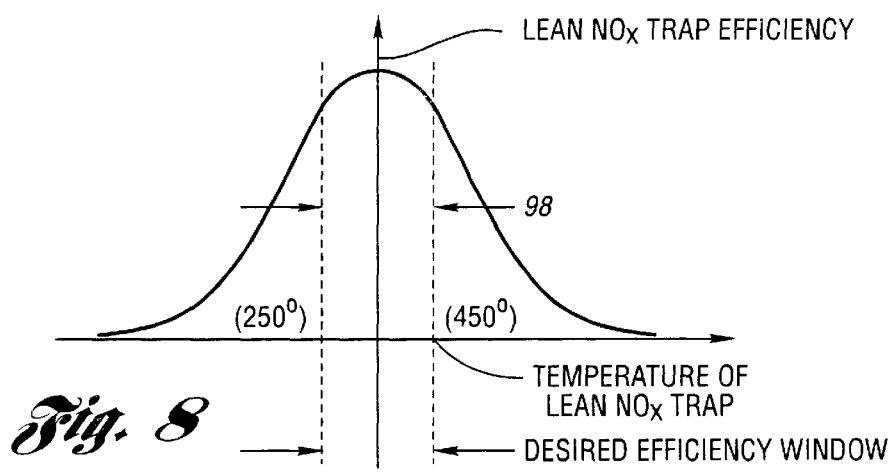
FIG. 8 is a plot of the lean $NO_x$ trap efficiency at various temperatures.

In FIG. 8, the maximum operating efficiency of the lean $NO_x$ trap is plotted versus the temperature of the $NO_x$ trap. The acceptable or desired efficiency of the $NO_x$ trap is indicated by the window 98, the limits of which are about 250° C. to 450° C. The excess hydrocarbons that are distributed through the catalytic converter will react with excess oxygen in the catalytic converter, which increases the temperature of the gases delivered to the LNT. This allows the lean $NO_x$ trap efficiency to operate within the acceptable efficiency window 98.

At least three principal benefits are achieved by employing the strategic injection sequence and injection timing of the invention. These benefits include a significant reduction in the pumping losses that is made possible because the engine can be operated for any given power level at a wider open throttle position. Further, the thermal efficiency of the combustion cycle is improved due to the insulating effect of the lean homogeneous mixture at the outer regions of the stratified charge, as discussed with reference to FIG. 1b. Thirdly, the combustion cycle, in accordance with the teachings of the invention, makes it possible for excess hydrocarbons to be released to the catalytic converter and exhaust trap so that the $NO_x$ trapping efficiency is greatly improved, as demonstrated in FIG. 8.

FIG. 9 shows the relationship between engine exhaust gas temperature and air/fuel ratio. The exhaust gas temperatures are relatively high at stoichiometric air/fuel ratios and at air/fuel ratios slightly lean of stoichiometric, as indicated at 100, and the temperature rapidly decreases as the air/fuel ratio becomes lean, as indicated at 102. By employing the teachings of the invention, exhaust gas temperatures for the LNT can be maintained within the efficiency window of FIG. 8.

It is possible in an alternative strategy to control the difference in timing between the fuel injection and the spark ignition when the engine is operating in the stratified mode with a single injection. As explained previously, the timing usually is adjusted to create the maximum torque and minimum emissions. The timing, however, is deliberately adjusted to achieve a less than maximum torque and a higher hydrocarbon production. This is done by injecting fuel earlier than normal when the cycle is in the compression stroke. This is indicated at point "C" in FIG. 3.

As indicated in FIG. 3, the injection of fuel at point "C", when the engine is operating in the stratified mode, is about 15 crankshaft degrees earlier than the injection point B previously discussed. This earlier injection provides additional time for the fuel and air to become mixed. The greater mixing results in a richer air/fuel ratio at the outer regions of the combustion zone, although the air/fuel ratio is still too lean to burn. The air/fuel ratio for the stratified charge, as previously mentioned, may be as low as 12:1 at the initial combustion kernel, but the air/fuel ratio at the outer regions of the combustion zone may be greatly in excess of 30:1.

During the exhaust stroke, a higher percentage of hydrocarbons will be discharged to the exhaust manifold because of the higher degree of mixing of the fuel and air that is achieved by reason of the adjustment of the timing of the fuel injection during the compression stroke to a more advanced setting.

Figure 7:
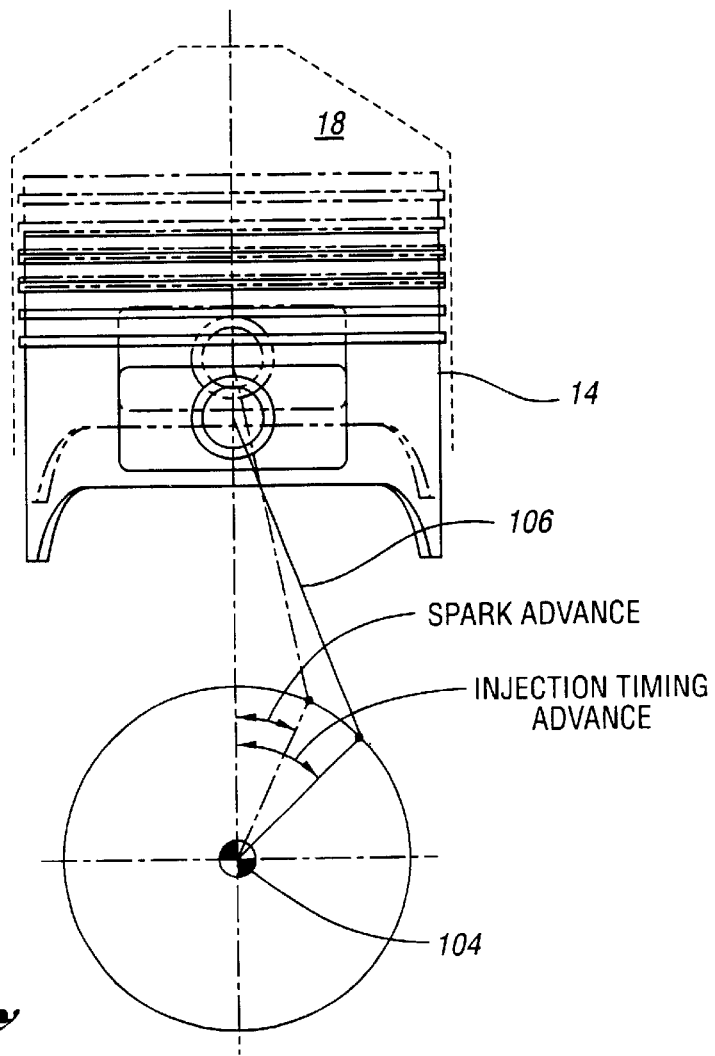
FIG. 7 is a schematic representation of the crankshaft and piston rod geometry.
Figure 10:
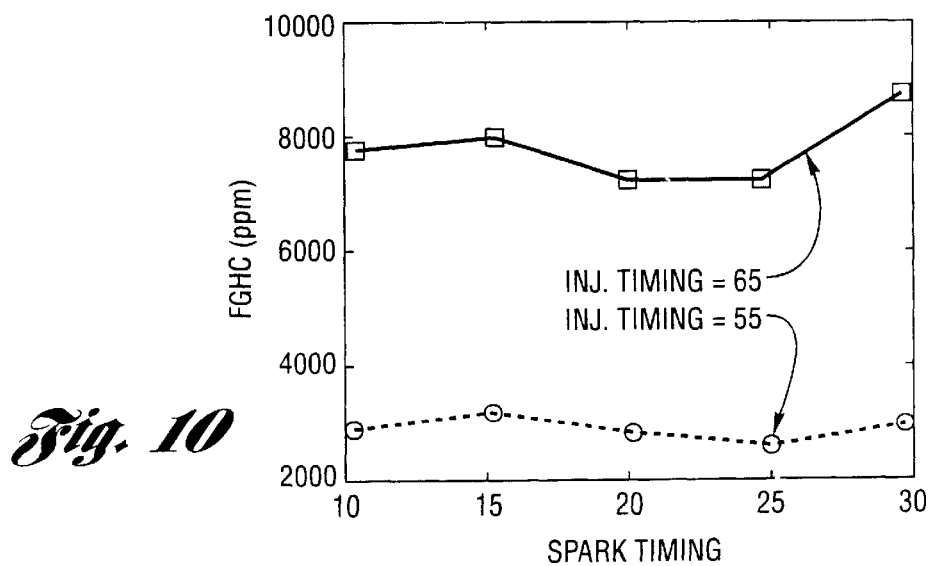
FIG. 10 is a plot that demonstrates the changes in hydrocarbon content in the exhaust gases as the injection timing changes for any given spark timing.

FIG. 10 shows the effect of the advancement of the injection during the compression stroke for any given spark timing. The spark advance and the injection advance are indicated schematically in FIG. 7 where the crankshaft is shown at 104 and the connecting rod is shown at 106.

It is indicated in FIG. 10 that a relatively modest advancement in the timing of the injection (e.g., advancing from 55° to 65°) will produce a significant increase in the exhaust gas hydrocarbon content in parts per million for any given spark timing.

Although preferred embodiments of the invention have been disclosed, it will be apparent to persons skilled in the art that modifications may be made without departing from the scope of the invention. All such modifications and equivalents thereof are intended to be covered by the following claims.

What is claimed is:

1. A method for controlling hydrocarbon content of exhaust gases of an internal combustion, spark ignition, fuel injected engine having at least one cylinder and piston assembly defining an air/fuel combustion chamber, the engine being characterized by an intake stroke, a compression stroke, an expansion stroke and an exhaust stroke and having a throttle-controlled air intake manifold, an exhaust gas manifold system, an air intake valve controlling communication between the intake manifold and the combustion chamber, an exhaust valve controlling communication with the exhaust gas manifold system, a fuel injection means for delivering timed fuel injections to the combustion chamber and an ignition means for igniting air/fuel charges in the combustion chamber;

the method comprising the steps of:
injecting fuel into the combustion chamber during the intake stroke of the piston during which intake air is drawn into the combustion chamber through the intake valve, the intake air and the injected fuel forming a charge having a lean homogeneous air/fuel mixture portion that is too lean to support combustion;

compressing the homogeneous air/fuel mixture during the compression stroke of the piston;

activating the fuel injector during the compression stroke to create a stratified air/fuel charge;

activating the ignition near the end of the compression stroke to create combustion gases during the subsequent expansion stroke; and exhausting the combustion gases and the air/fuel mixture through the exhaust valve into the exhaust manifold system whereby unburned hydrocarbons in the stratified air/fuel charge are discharged from the combustion chamber together with hydrocarbons in the unburned homogeneous mixture thereby creating excess hydrocarbon content in the presence of excess oxygen in the exhaust manifold system;

the exhaust manifold system including a catalytic converter for oxidizing hydrocarbons in the combustion gases thereby raising the combustion gas temperature at the outlet side of the catalytic converter;

the exhaust gas manifold system trapping oxides of nitrogen in the combustion gases at the gas flow outlet side of the catalytic converter as the temperature of the combustion gases is maintained at an elevated level for maximum trapping efficiency, whereby the air/fuel ratio in the combustion chamber may be maintained at an optimum lean value for improved combustion efficiency and the throttle setting for the engine throttle may be increased for reduced pumping losses.

2. The method set forth in claim 1 including the step of activating the fuel injector in advance of activation of the ignitor during the compression stroke whereby a stratified air/fuel charge is created in the combustion chamber after the creation of a homogeneous air/fuel charge is created following activation of the injector during the intake stroke.

3. The method set forth in claim 1 wherein the homogeneous air/fuel mixture is leaner than that value required to support combustion in the combustion chamber.

4. The method set forth in claim 2 wherein the homogeneous air/fuel mixture is leaner than that value required to support combustion in the combustion chamber.

5. A method for controlling hydrocarbon content of exhaust gases of an internal combustion, spark ignition, fuel injected engine having at least one cylinder and piston assembly defining an air/fuel combustion chamber, the engine being characterized by an intake stroke, a compression stroke, an expansion stroke and an exhaust stroke and having a throttle-controlled air intake manifold, an exhaust gas manifold system, an air intake valve controlling communication between the intake manifold and the combustion chamber, an exhaust valve controlling communication with the exhaust gas manifold system, a fuel injection means for delivering timed fuel charges to the combustion chamber and an ignition means for igniting air/fuel charges in the combustion chamber;

activating the fuel ignition means during the compression stroke at an instant between the end of the compression stroke and a mid-position of the piston during the compression stroke whereby the air/fuel mixture created by the fuel injection has sufficient time to mix with air in the combustion chamber to create a lean combustible stratified charge portion in the combustion chamber and a mixture portion that is too lean to support combustion, whereby excess hydrocarbons are delivered to the exhaust manifold system in the presence of excess air, the excess hydrocarbons reacting with excess air and creating a controlled increased exhaust gas temperature; and trapping nitrogen oxides in the exhaust gases as the temperature is maintained at an elevated level for maximum trapping efficiency.

6. The method set forth in claim 5 including the step of trapping oxides of nitrogen in the combustion gases, the exhaust manifold system having a catalytic converter for oxidizing exhaust gas thereby increasing exhaust gas temperatures, the operating temperature for trapping oxides of nitrogen being increased because of the presence of excess hydrocarbons in the exhaust gas thereby increasing exhaust gas trapping efficiency.

\* \* \* \* \*